United States Patent [19]

Chang et al.

[11] Patent Number: 5,653,902

[45] Date of Patent: Aug. 5, 1997

[54] METHOD AND DEVICE OF CORRECTING A WELDING PATH OF AN AUTOMATIC WELDING APPARATUS

[75] Inventors: Nag Young Chang, Kyounggi-do; Jae Sung Choi; Soon Chang Kown, both of Seoul; Kyung Il Kim, Incheon; Jong Myoung Lee, Kyounggi-do, all of Rep. of Korea

[73] Assignee: Institute for Advanced Engineering, Rep. of Korea

[21] Appl. No.: 533,360

[22] Filed: Sep. 25, 1995

[30] Foreign Application Priority Data

Sep. 28, 1994 [KR] Rep. of Korea .................. 94-24480

[51] Int. Cl.⁶ .................................................. B23K 9/127
[52] U.S. Cl. ............................ 219/124.34; 219/125.12
[58] Field of Search .......................... 219/124.34, 124.22, 219/125.12

[56] References Cited

U.S. PATENT DOCUMENTS

| | | | |
|---|---|---|---|
| 4,350,868 | 9/1982 | Takagi et al. | 219/124.22 |
| 4,417,126 | 11/1983 | Kasahara et al. | 219/124.34 |
| 4,477,713 | 10/1984 | Cook et al. | 219/124.34 |
| 4,587,398 | 5/1986 | Sarugaku et al. | 219/124.22 |
| 4,608,481 | 8/1986 | Nomura et al. | 219/124.34 |
| 4,857,700 | 8/1989 | Toyoda et al. | 219/124.34 |
| 4,906,814 | 3/1990 | Toyoda et al. | 219/125.12 |
| 4,920,248 | 4/1990 | Toyoda et al. | 219/124.34 |
| 4,990,743 | 2/1991 | Kugai et al. | 219/124.34 |
| 5,066,847 | 11/1991 | Kishi et al. | 219/124.34 |

*Primary Examiner*—Clifford C. Shaw
*Attorney, Agent, or Firm*—Merchant, Gould, Smith, Edell, Welter & Schmidt

[57] ABSTRACT

A method and device of correcting a welding path of an automatic welding apparatus are disclosed. In order to prevent the deviation of a welding torch from the predetermined welding path due to deformation of structure, a position correction amount is used. The position correction amount is determined by setting a mean welding current for the up-down direction position correction, which is determined by averaging the welding current, and by setting a weight value for the left-right direction position correction, in which the weight value is determined by multiplying the welding current by a weight factor, thereby a welding torch follows the predetermined welding path precisely.

8 Claims, 6 Drawing Sheets

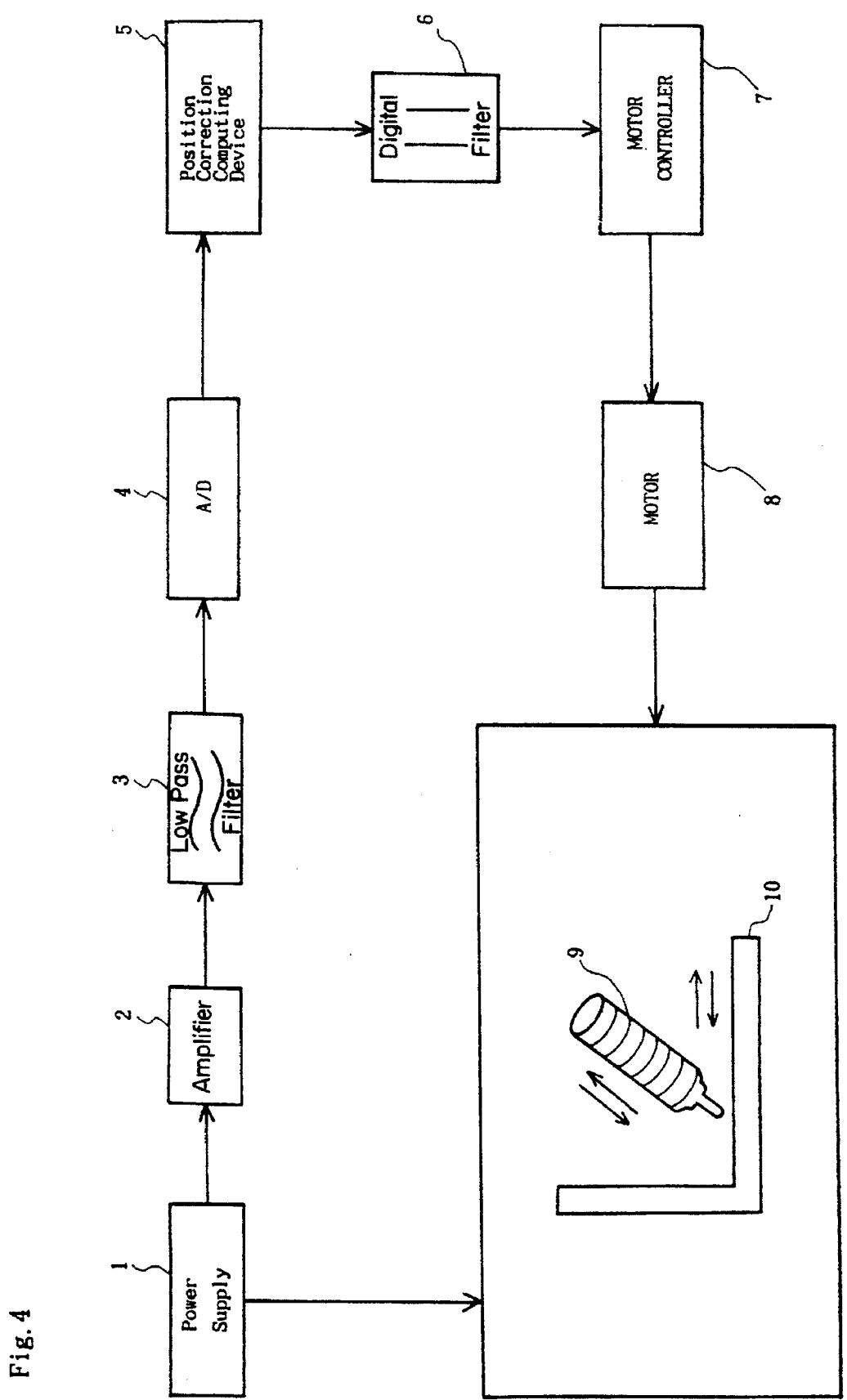

METHOD AND DEVICE OF CORRECTING A WELDING PATH OF AN AUTOMATIC WELDING APPARATUS

BACKGROUND OF THE INVENTION

1. Field of the Invention

The invention relates to a device and method for correcting a welding path of an automatic welding apparatus and, more particularly, to a device and method for correcting the welding path of an automatic welding apparatus for a welding torch to track a desired welding path precisely.

2. Background of the Invention

Generally, an automatic welding apparatus performs welding by weaving the welding torch in the up-down and the left-right directions of the welding path. When the welding torch deviates from the predetermined welding path, the automatic welding apparatus detects the welding current change and corrects the welding path letting the welding torch track the welding path.

According to the conventional method of correcting the welding path of an automatic welding apparatus, the correction of the welding path is performed at every half cycle of the weaving of the welding torch and welding is done by weaving the welding torch in the left-right direction along the welding path. An integrated value of welding current of the welding torch is computed every half cycle of weaving so that the correction direction and correction amount are decided, which is described in U.S. Pat. No. 5,066,847 assigned to Fanuc Ltd., Japan.

FIG. 1A through FIG. 1C are views for describing the conventional method described above of correcting the welding path in the left-right direction.

FIG. 1A illustrates the welding path between a welding position $P_1$ and a welding position $P_2$ during a half cycle of weaving from time $t_1$ to time $t_2$.

FIG. 1B shows a comparison of two integrated values of the welding current obtained in between time $t_1$ and $t_2$, one between $t_0$ and $t_1$ and the other between $t_0$ and $t_2$, where time $t_0=(t_1+t_2)/2$. The integrated value of the welding current $S_1$ between $t_0$ and $t_1$ and the integrated value of the welding current $S_2$ between $t_0$ and $t_2$ are compared, and the correction is made in the direction which increases of the smaller of the two, $S_1$ and $S_2$. In other words, when $S_1<S_2$, correction is made the correction is made in the direction $S_1$ and when $S_1>S_2$, in the other direction. Here, the correction amount T1 is, $T1=[(S_2/S_1)-1]\times \Delta_1$ where T1 is correction amount and $\Delta_1$ represents a coefficient.

FIG. 1C shows the method of correcting the welding path in the left-right direction of the conventional method, in which the correction direction of welding path is indicated by the arrow P with respect to the weaving surface.

FIGS. 2A and 2B show the method of correcting the welding path in the up-down direction with respect to the weaving surface of the conventional method. In FIG. 2A, the integrated value $S_3$ during the half cycle of weaving between time $t_1$ and time $t_2$ is preset, and then the integrated value of actual welding current $S_4=S_3+S_3'$ is determined. Then, the integrated value $S_3$ is compared with the integrated value $S_4$ so as to correct the welding path in a manner that when $S_3<S_4$, the direction of the position correction is made downward, the torch approaching the workpiece, and when $S_3>S_4$, the direction of the position correction is made upward, the torch moving away from the workpiece.

Here, the position correction amount $T2=[(S_4/S_3)-1]\times \Delta_2$, where $\Delta_2$ represents a coefficient. The direction of the position correction in this case is the up-down direction as indicated by the arrow q with respect to the weaving surface (FIG. 2B).

FIG. 3A shows the comparison of welding current in a flux cored arc welding apparatus with varying welding conditions. As shown, the welding current change is irregular because of the noise effect.

FIG. 3B shows the experimental model in the flux cored arc welding process.

Here, when the value of the welding current applied to the automatic welding apparatus is small, the change of welding current with respect to the change of the tip-to-workpiece distance is small, and hence the sensitivity of the welding current is also small. For example, as shown, if flux cored wire is used instead of solid wire, then the welding current applied becomes small and the slope described in FIG. 3B becomes small thereby making the sensitivity of the welding current small and, as a result, the welding current sensing becomes difficult.

Also, as the welding in the vertical direction employs lower current than in the horizontal one, the sensitivity of the welding current is even lower in vertical direction.

According to the conventional method of correcting the welding path described above, the method comprises the steps of: computing the reference integrated value of the welding current of the welding torch for every half cycle of weaving; determining the direction of correction by comparing the reference integrated value with an actual integrated value of half cycle of weaving; determining a correction amount in a direction which will vary a distance between the weaving surface and the workpiece depending upon a difference in the actual integrated value with respect to the reference integrated value; and correcting the welding path by multiplying the correction amount by a predetermined coefficient.

However, the conventional method of correcting the welding path has the following problems. Specifically, in detecting the welding current of the automatic welding apparatus, noise or drastic changes of current may occur and the change of the actual current during welding is irregular. If the tip-to-workpiece distance increases, the welding current decreases and especially, if the welding torch is slowly biased, it is difficult to discriminate between the welding current and noise, and hence it is difficult to obtain a reliable value of the welding current.

Accordingly, it is difficult to obtain an adequate correction because the increase or decrease of integrated value of the welding current occurs substantially at every half cycle of weaving, and hence it is difficult to set the reference integrated value and the coefficient for the correction amount.

SUMMARY OF THE INVENTION

It is therefore an object of the present invention to solve the foregoing problem and its object is to provide a method and device of correcting the welding path of an automatic welding apparatus which improves the sensitivity of the welding current, thereby achieving the correction of the welding path in the left-right and up-down directions precisely.

The preceding objects should be construed as merely presenting a few of the more pertinent features and applications of the invention. Many other beneficial results can be obtained by applying the disclosed invention in a different manner or modifying the invention within the scope of the disclosure. Accordingly, other objects may be had by referring to both the summary of the invention and the embodiment in addition to the scope of the invention defined by the claims considered in conjunction with the accompanying drawings.

For the purpose of summarizing the invention, the invention comprises the step of amplifying a welding current from a welding power supply. Next, noise included in the amplified current is eliminated by low-pass filtering the amplified welding current to thereby produce a noise-free analogy signal. Then, a position correction amount is determined by setting a weight value and a mean welding current. Finally, the position correction amount is applied to a motor controller and drives a motor and makes the welding torch track a precise predetermined welding path.

Also, the invention employs the device of an automatic welding apparatus comprising an amplifier for amplifying a welding current supplied from a welding power supply, an analog filter for eliminating noises included in the amplified current to thereby produce a noise-free analog signal, an A/D converter for converting said analog signal to a digital signal, a position correction computing means for determining a position correction amount by setting a weight value and a mean welding current, and a motor controller for driving a motor by the position correction amount outputted from the position correction computing means.

The more pertinent and important features of the present invention have been outlined above in order that the detailed description of the invention which follows will be better understood and that the present contribution to the art can be fully appreciated.

Additional features of the invention described hereinafter form the subject of the claims of the invention. Those skilled in the art can appreciate that the conception and the specific embodiment disclosed herein may be readily utilized as a basis for modifying or designing other structures for carrying out the same purposes of the present invention.

Further, those skilled in the art can realize that such equivalent constructions do not depart from the spirit and scope of the invention as set forth in the claims.

BRIEF DESCRIPTION OF THE DRAWINGS

For understanding of the nature and objects of the invention, reference should be had to the following detailed description taken in conjunction with the accompanying drawings in which:

FIG. 4 is a the overall structure of the automatic welding apparatus for correcting the welding path of an automatic welding apparatus according to the present invention;

Figure 1A:
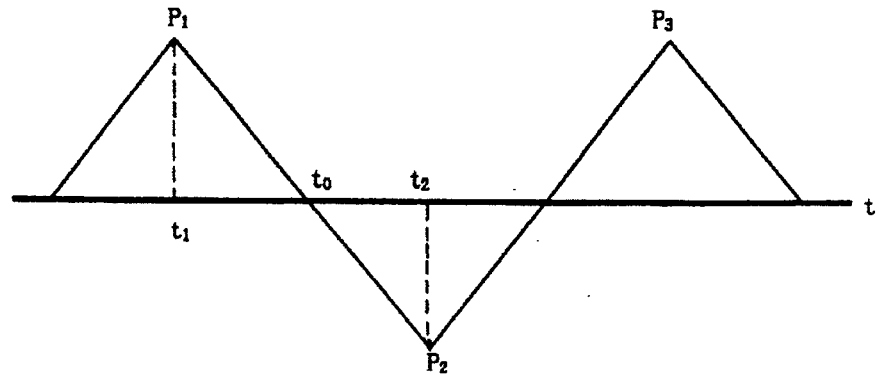
FIG. 1A is a diagram to explain the welding path of the half cycle of weaving according to the prior art automatic welding apparatus.
Figure 1B:
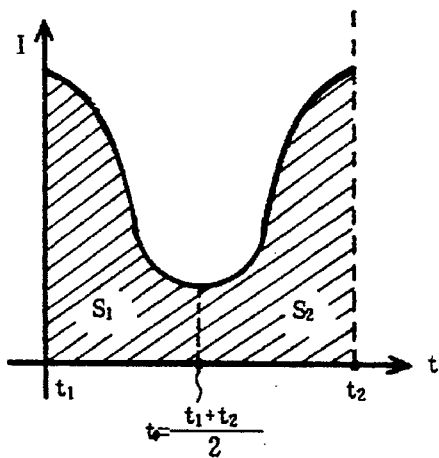
FIG. 1B is a diagram to explain the integrated value of the welding current of the prior art automatic welding apparatus.
Figure 1C:
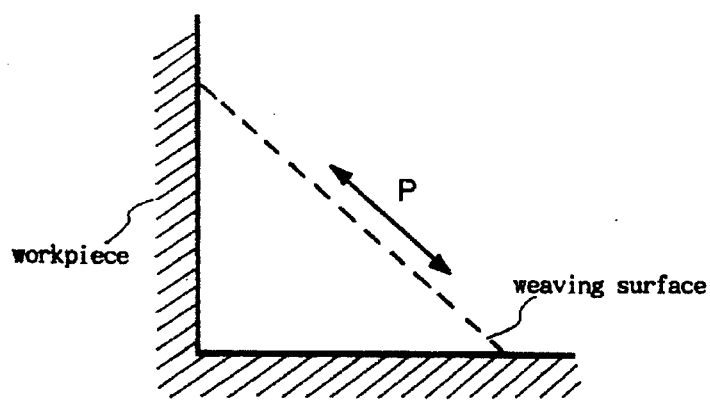
FIG. 1C is a diagram to explain the method of correcting the welding path in the left-right direction on the weaving surface of the prior art automatic welding apparatus.
Figure 2A:
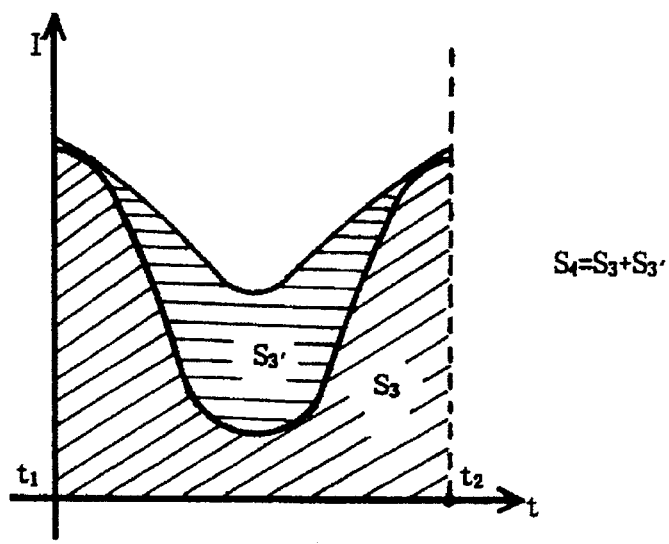
FIG. 2A is a diagram to compare the reference integrated value ($S_3$) of the welding current with the integrated value ($S_4$) of the actual welding current during a half cycle of weaving.
Figure 2B:
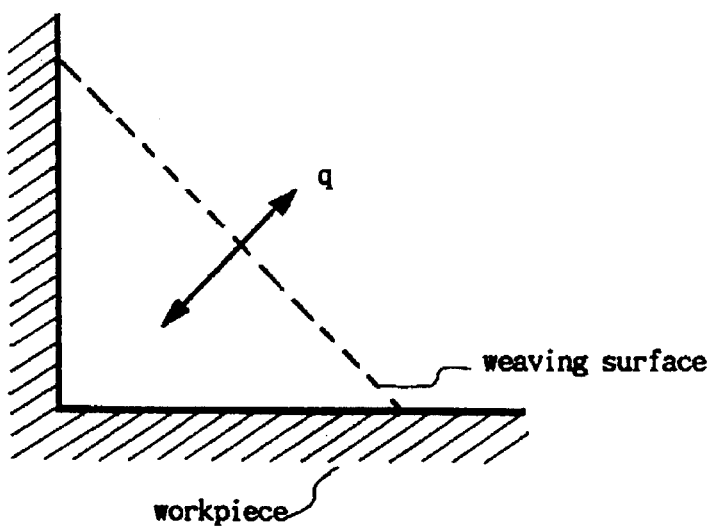
FIG. 2B is a diagram to explain the method of correcting the welding path in the up-down direction on the weaving surface of the prior art automatic welding apparatus.
Figure 3A:
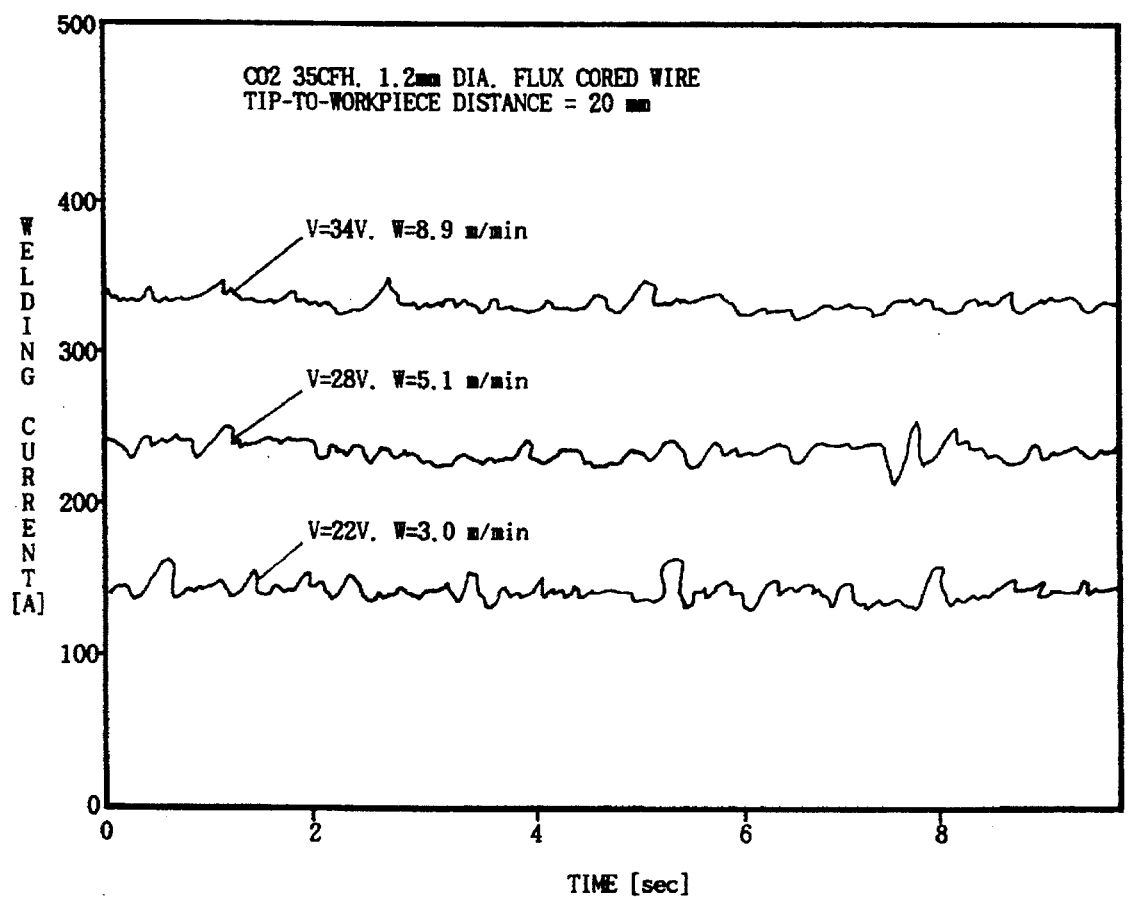
FIG. 3A shows a comparison of welding current in flux cored arc welding apparatus with varying welding conditions.
Figure 3B:
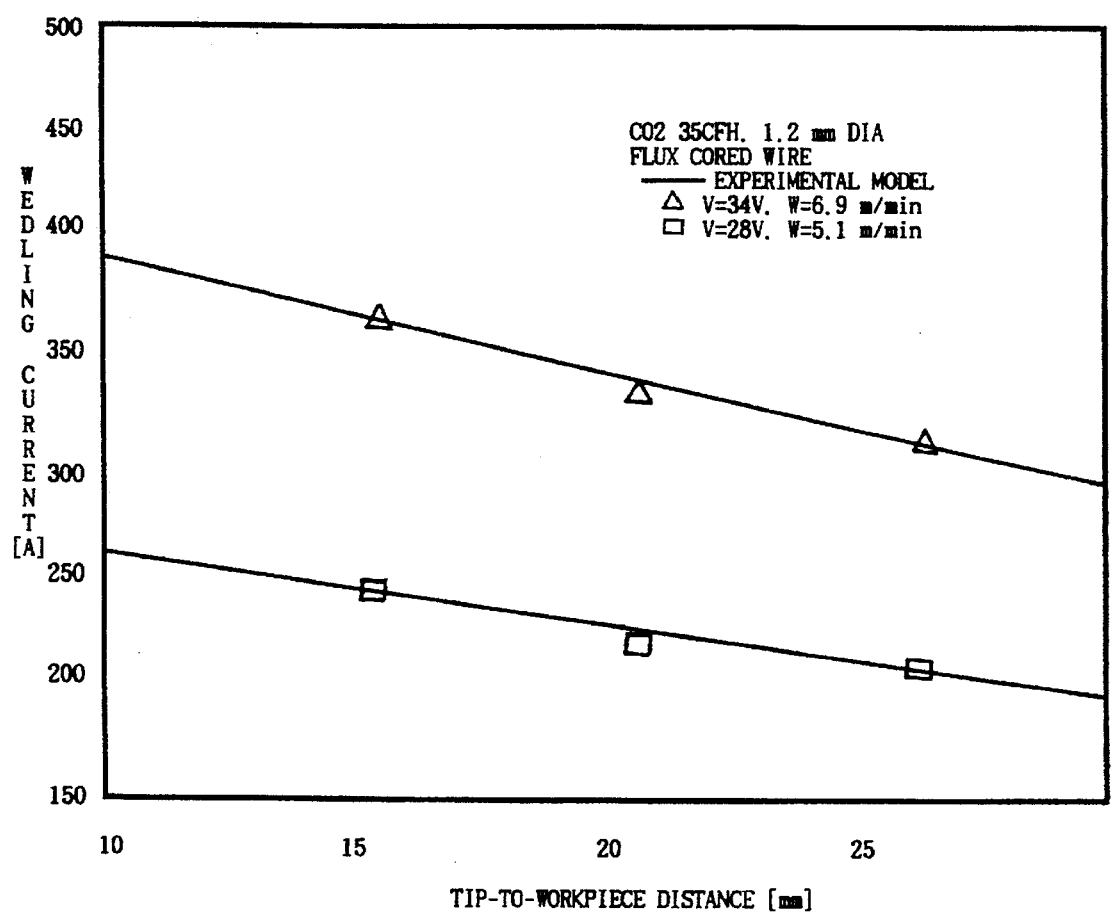
FIG. 3B shows an experimental model in flux cored arc welding process.

The novel feature of the present invention may be understood from the accompanying description when taken in conjunction with the accompanying drawings.

DETAILED DESCRIPTION OF THE PREFERRED EMBODIMENT

FIG. 4 is a diagram of overall structure of an automatic welding apparatus to explain the method of correcting the welding path of an automatic welding apparatus according to the present invention.

In FIG. 4, the current supplied from a welding power supply 1 is amplified through an amplifier 2 and then noise is filtered out through an analog low-pass filter 3, to thereby produce a noise-free analog signal. The filtered current passes through an A/D converter 4, and is converted to a digital signal.

Next, the digital signal then passes a position correction computing device 5 which is a computer, that sets a new weight value for the digital signal by multiplying a weight factor by the digital signal, and then determines a position correction amount. The determined position correction amount is then transferred through a digital filter 6 to a motor controller 7. Finally, the motor controller 7 drives a motor 8 and the motor 8 moves a welding torch 9 to track the welding path of the workpiece 10 precisely.

Figure 5A:
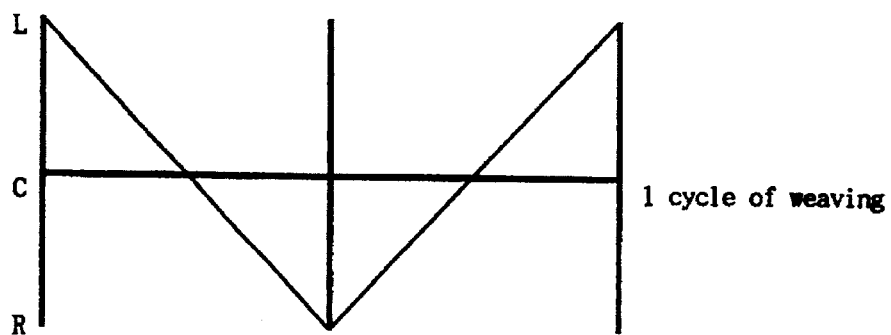
FIG. 5A is a diagram showing the welding path of the welding torch during one cycle of weaving to explain the method of correcting the welding path of the automatic welding apparatus according to the present invention.
Figure 5B:
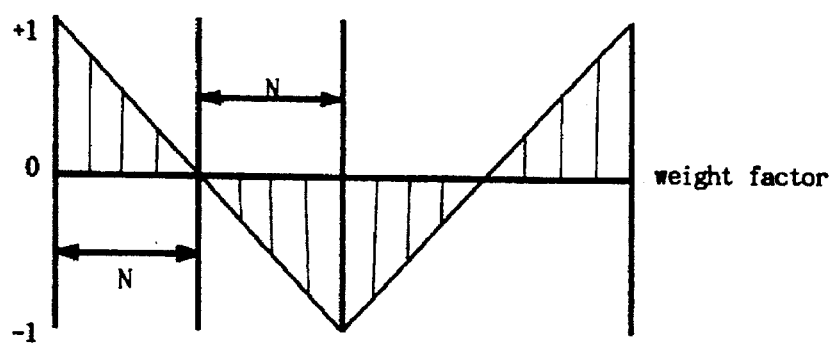
FIG. 5B is a diagram showing the weight factors during one cycle of weaving to explain the method of correcting the welding path of the automatic welding apparatus according to the present invention.
Figure 5C:
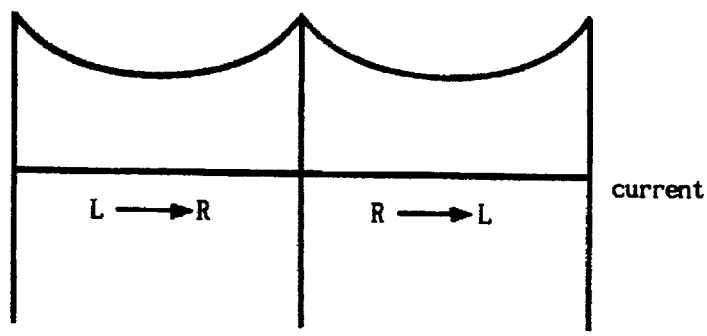
FIG. 5C is a diagram showing the amount of the welding current corrected during one cycle of weaving to explain the method of correcting the welding path of the automatic welding apparatus according to the present invention.

FIG. 5A through FIG. 5C are diagrams to explain the method of correcting the welding path of the automatic welding apparatus according to the invention.

Here, the method of correcting the welding path of automatic welding apparatus involves the detection of the welding current at every half cycle of weaving, and there are two ways to correct the welding path, one in the left-right direction and the other in the up-down direction.

FIG. 5A shows the welding path of the welding torch during one cycle of weaving in which the welding is performed in the left (L)—right (R) direction along a welding path C.

FIG. 5B shows a weight factor for one cycle of weaving in which the weight factor has a value between −1 and +1.

FIG. 5C shows the value of the welding current after curve fitting. Here, in an automatic welding apparatus a constant-voltage characteristic is usually used, therefore, the greater the tip-to-workpiece distance becomes, the smaller the welding current becomes, and the smaller the tip-to-workpiece distance becomes, the greater the welding current becomes.

Using that characteristic, a small weight factor is multiplied by the welding current in the center of the welding path and a large weight factor is multiplied by the welding current at the end of the welding path, thereby obtaining new data of welding current, that is a weight value.

Here, there are two kinds of weight factors, namely, a first order weight factor and a second order weight factor, and either one can be used arbitrarily.

The first order weight factor:

$$W_L = \Sigma A_i \Phi_i \ (\Phi_i = 1/n, 2/n, \ldots, n/n)$$

$$W_R = \Sigma A_i \Phi_i \ \{\Phi_i = 1/n(-1), 2/n(-1), \ldots, n/n(-1)\}$$

The second order weight factor:

$$W_L = \Sigma A_i \Phi_i \ (\Phi_i = (1/n)^2, (2/n)^2, \ldots (n/n)^2)$$

$$W_R = \Sigma A_i \Phi_i \ \{\Phi_i = (1/n)^2(-1), (2/n)^2(-1), \ldots, (n/n)^2(-1)\}$$

where $W_L$ is the sum of weight value for the left ¼ cycle of weaving;

$W_R$ is the sum of weight value for the right ¼ cycle of weaving;

$\phi$ is a weight factor;

$A_i$ is a measured value of welding current; and n is the number of data for the ¼ cycle of weaving.

Here, the position correction amount in the left-right direction is $W=W_L+W_R$ and the position correction amount in the up-down direction, which is a mean welding current, is $D=\Sigma(Ai/n)$.

It should be noted that the reference value of W and D must be predetermined. The values of W and D obtained from the equation above are used to efficiently correct the welding path in the left-right and up-down directions simultaneously.

In case of such a simultaneous correction, the first two cycles of weaving do not give reliable data of the current because of the effect of noise. Hence, from the next half cycle of weaving after the first two cycles of weaving, the value of the welding current is selected for the correction of the welding path. Also, in order to raise the reliability of data, repetition is performed by combining the value of half cycle of weaving above and the value of the previous ones.

As described above, in the conventional method of correcting the welding path of the automatic welding apparatus, welding is performed, while the welding torch is weaved in the left-right direction of the welding path, by comparing the reference integrated value of the welding current with the actual integrated value of the welding current and determining a position correct amount.

However, according to the conventional method, when the workpiece is far from the welding torch and the welding torch is slowly biased, the value of welding current is small, and hence it is difficult to obtain reliable data of the values of current since noise and current are hardly distinguishable.

On the other hand, according to the present invention the position correction amount in the up-down direction is obtained by using the mean welding current in a half cycle of weaving and the position correction amount in the left-right direction is obtained by the weight value, in which the weight value is obtained by multiplying the welding current by the weight factor. At this point, a small value of weight factor is used at the center of the welding path, and a large value is used at each end of the welding path to amplify the welding current and hence it becomes easy to distinguish a reliable welding current from noise.

Accordingly, reliable data of smooth and precise welding torch movements is performed without the influence of noise by achieving the correction of the welding path in the left-right and up-down directions precisely, using the weight value and the mean welding current.

While the invention has been particularly shown and described in reference to preferred embodiments thereof, it will be understood by those skilled in the art that changes in form and details may be made therein without departing from the spirit and the scope of the invention.

What is claimed is:

1. A method of correcting a welding path of an automatic welding apparatus including a welding torch, a motor for driving the welding torch and a motor controller for controlling the motor, said welding torch weaving in cycles along said welding path, comprising the steps of:

(a) amplifying a welding current from a power supply;

(b) eliminating noises included in the amplified welding current by low-pass filtering said amplified welding current to thereby produce a noise-free analog signal:

(c) converting said noise-free analog signal to a digital signal representing said welding current;

(d) using said digital signal, determining up-down and left-right correction amounts, wherein said up-down correction amount is determined by comparing a predetermined reference value with a mean of the welding current for ½ weaving cycle, and wherein said left-right correction amount is determined by multiplying the welding current by a weight factor, said weight factor having a larger value at either edge area of the weaving cycle than that at a center area of the weaving cycle and thereafter, a first sum of a first weighted welding current for a left ¼ weaving cycle is compared with a second sum of a second weighted welding current for a right ¼ weaving cycle so as to obtain a difference value therebetween; and (e) applying said up-down and left-right correction amounts to said motor controller thereby driving said motor and making the welding torch track a predetermined welding path.

2. A method of correcting a welding path of an automatic welding apparatus according to claim 1, wherein, in said step (e), said welding torch is weaved in a left-right direction of the welding path, and in an up-down direction of the welding path concurrently.

3. A method of correcting a welding path of an automatic welding apparatus according to claim 2, wherein when using the up-down and left-right correction amounts, the welding current for the first one or two cycles of weaving are not used, while those of subsequent half cycles of weaving are used.

4. A method of correcting a welding path of an automatic welding apparatus according to claim 1, wherein a reference value of the mean of the welding current and a reference value of the weight factor used to determine the up-down and left-right corrections amount are obtained by averaging a value of numerous cycles of weaving.

5. The method of correcting a welding path of an automatic welding apparatus according to claim 1, wherein a ½ weaving cycle has a starting point and an ending point, and in said step (b), said each weight factor for each sample is varied constantly from 1 at the starting point of the ½ weaving cycle to −1 at the ending point of the ½ weaving cycle.

6. A method of correcting a welding path of an automatic welding apparatus according to claim 5, wherein a reference value of the mean welding current and a reference value of the weight value used to determine up-down and left-right correction amount are obtained by averaging over numerous cycles of weaving.

7. A device for correcting a welding path of an automatic welding apparatus comprising:

an amplifier for amplifying a welding current supplied from a welding power supply;

an analog filter for eliminating noise included in an amplified welding current to thereby produce a noise-free analog signal;

an A/D converter for converting said noise-free analog signal to a digital signal;

a computing means for determining up-down and left-right correction amounts by setting a weight value which is determined by multiplying said digital signal by a weight factor and a mean welding current which is determined by averaging the welding current; and a motor controller for driving a motor by said up-down and left-right correction amounts outputted from said computing means.

8. A method of correcting a welding path of an automatic welding apparatus including a welding torch, said welding torch weaving in cycles along said welding path, comprising the steps of:

(a) detecting a welding current for ½ weaving cycle of the welding torch;

(b) obtaining each weight factor for each sample of welding current having a constant distance;

(c) multiplying said each weight factor by each welding current for corresponding sample to obtain multiplied welding currents;

(d) comparing a former weighted mean welding current obtained by averaging said multiplied welding currents during the first ¼ weaving cycle with a latter weighted mean welding current obtained by averaging said multiplied welding currents during a next ¼ weaving cycle;

(e) one of moving the welding torch in a left direction if said former weighted mean welding current is less than (e) one of moving the welding torch in a left direction if said former weighted mean welding current is less than that of the latter weighted mean welding current, and moving said welding torch in a right direction, if the latter weighted mean welding current is less than that of the former weighted mean welding current.

* * * * *